US009758241B2

(12) United States Patent
Forrester, Jr.

(10) Patent No.: US 9,758,241 B2
(45) Date of Patent: Sep. 12, 2017

(54) NOSE WHEEL STEERING VALVE (71) Applicant: NATIONAL MACHINE COMPANY, Stow, OH (US)

(72) Inventor: Raymond Alvero Forrester, Jr., Akron, OH (US)

(73) Assignee: NATIONAL MACHINE COMPANY, Stow, OH (US)

(*) Notice: Subject to any disclaimer, the term of this patent is extended or adjusted under 35 U.S.C. 154(b) by 72 days.

(21) Appl. No.: 14/879,664

(22) Filed: Oct. 9, 2015

(65) Prior Publication Data
US 2016/0101848 A1  Apr. 14, 2016

Related U.S. Application Data

(60) Provisional application No. 62/061,852, filed on Oct. 9, 2014.

(51) Int. Cl.
*F16K 11/074* (2006.01)
*F16K 27/04* (2006.01)
(Continued)

(52) U.S. Cl.
CPC .......... *B64C 25/50* (2013.01); *F16K 11/074* (2013.01); *F16K 11/0856* (2013.01);
(Continued)

(58) Field of Classification Search
CPC ....... B64C 25/50; F16K 11/074; F16K 27/04; Y10T 137/86654; Y10T 137/86871; B62D 5/083
See application file for complete search history.

(56) References Cited

U.S. PATENT DOCUMENTS 3,033,226 A * 5/1962 Allen .................. F16K 5/0421
137/315.07
3,135,293 A * 6/1964 Hulsey ................ F16K 5/0421
137/625.3
(Continued)

FOREIGN PATENT DOCUMENTS

EP  0031683 A2  8/1981

OTHER PUBLICATIONS

Notification Concerning Transmittal of International Preliminary Report on Patentability, The International Bureau of WIPO, International Search Report and Written Opinion, dated Apr. 20, 2017, PCT/US2015/054875.

*Primary Examiner* — Craig Schneider
*Assistant Examiner* — Kevin Barss
(74) *Attorney, Agent, or Firm* — Vorys, Sater, Seymour and Pease LLP (57) ABSTRACT

A steering valve includes a housing and a spool disposed inside the housing. The housing includes a top plane and a bottom plane, the top plane including an opening of a first port and the bottom plane including an opening of a second port. The spool includes a top plane including a first and second opening corresponding to a third port and a fourth port, one of which is configured to align with the opening of the first port depending on the orientation of the housing. The spool also includes a bottom plane including a first and second opening corresponding to the third port and fourth port, one of which is configured to align with the opening of the second port depending on the orientation of the housing. The housing is configured to rotate around the spool and wherein the orientation of the housing determines whether the first port is fluidly coupled to the third port via the first opening in the top plane of the spool while the second port is fluidly coupled to the fourth port via the first opening on the bottom plane of the spool or whether the second port is (Continued)

fluidly coupled to the third port via the second opening in the top plane of the spool while the first port is fluidly coupled to the fourth port via the second opening on the bottom plane of the spool.

7 Claims, 8 Drawing Sheets (51) Int. Cl.
  *B64C 25/50* (2006.01)
  *F16K 11/085* (2006.01)
  *B62D 5/083* (2006.01)

(52) U.S. Cl.
  CPC .............. *F16K 27/04* (2013.01); *B62D 5/083* (2013.01); *Y10T 137/86654* (2015.04); *Y10T 137/86871* (2015.04)

(56) References Cited

U.S. PATENT DOCUMENTS

| | | | | |
|---|---|---|---|---|
| 3,190,584 A * | 6/1965 | Gire | ................ | B64C 29/0091 137/625.46 |
| 3,454,049 A * | 7/1969 | Hoos | ....................... | F15B 13/04 137/625.23 |
| 3,692,041 A * | 9/1972 | Bondi | ...................... | F02C 7/22 137/238 |
| 4,925,097 A * | 5/1990 | Corrigan | ............... | B05B 1/3026 137/887 |
| 5,273,072 A * | 12/1993 | Phillips | ................. | B62D 5/083 137/625.23 |
| 5,332,194 A * | 7/1994 | Austin, Jr. | ........... | A61C 1/0061 251/344 |
| 6,170,448 B1 * | 1/2001 | Asakura | ................ | F01L 1/3442 123/90.17 |
| 6,349,788 B1 * | 2/2002 | Wang | ..................... | B62D 5/083 137/625.23 |
| 7,131,460 B2 * | 11/2006 | McLane | ............. | B60H 1/00485 137/625.47 |
| 7,322,375 B2 * | 1/2008 | Goldfarb | ............... | F16K 11/085 137/625.22 |
| 7,516,615 B1 * | 4/2009 | Trimble | ................. | F01B 13/04 417/238 |
| 2001/0013368 A1 | 8/2001 | Igawa et al. | | |
| 2006/0169520 A1 | 8/2006 | Miyazaki | | |
| 2013/0015013 A1 | 1/2013 | Sunaga et al. | | |
| 2013/0075642 A1 | 3/2013 | Hervieux et al. | | |

* cited by examiner

ISOMETRIC VIEW OF PORT "B"

FIG. 6

ISOMETRIC VIEW OF PORT "A"

NOSE WHEEL STEERING VALVE

CROSS-REFERENCE TO RELATED APPLICATIONS

This U.S. patent application claims priority to and the benefit of Provisional U.S. Patent Application Ser. No. 62/061,852 filed on Oct. 9, 2014, which is incorporated by reference herein in its entirety.

BACKGROUND

Steering valves are commonly used in a variety of applications, such as in the nose of a commercial aircraft or in other vehicles, to assist with steering. Also referred to as a changeover valve or a swivel valve, the steering valve directs flow of hydraulic fluid for actuator pistons that control the steering of the vehicle. By rotating the position of the valve, the flow of fluid can be re-directed between one of two ports in order to control the inlet flow and the outlet flow to an actuator. Thus, as a result of the rotation and depending on the position of the valve, a vehicle can be steered in a desired direction.

To adjust the flow of fluid in known steering valves, a spool inside a housing is rotated so that a port of the housing lines up with one of the two ports positioned on a lateral plane on the spool. In order to create a tight seal and to minimize or prevent fluids from leaking during rotation between ports, a steering valve commonly requires that a spool and housing be very closely coupled together with minimal clearance. It may be costly, burdensome, and time consuming, however, to achieve such a tolerance requirement. In addition, the valve may lack durability and be prone to leaking which may result in a vehicle's steering mechanism malfunctioning or failing.

SUMMARY

A steering valve according to the present invention includes a housing and a spool disposed inside the housing. The housing includes a top plane and a bottom plane, the top plane including an opening of a first port and the bottom plane including an opening of a second port. The spool includes a top plane including a first and second opening corresponding to a third port and a fourth port, one of which is configured to align with the opening of the first port depending on the orientation of the housing. The spool also includes a bottom plane including a first and second opening corresponding to the third port and fourth port, one of which is configured to align with the opening of the second port depending on the orientation of the housing. The housing is configured to rotate around the spool and wherein the orientation of the housing determines whether the first port is fluidly coupled to the third port via the first opening in the top plane of the spool while the second port is fluidly coupled to the fourth port via the first opening on the bottom plane of the spool or whether the second port is fluidly coupled to the third port via the second opening in the top plane of the spool while the first port is fluidly coupled to the fourth port via the second opening on the bottom plane of the spool.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

FIGS. 1-14 generally show a model of an example steering valve. The model is used for illustration purposes and may not be to scale. It should be appreciated that, although the example described herein may refer to a steering valve for use in a nose wheel of a commercial aircraft, the steering valve may similarly be used in tractors, automobiles, and other suitable vehicles or mechanical equipment and machinery.

Figure 1:
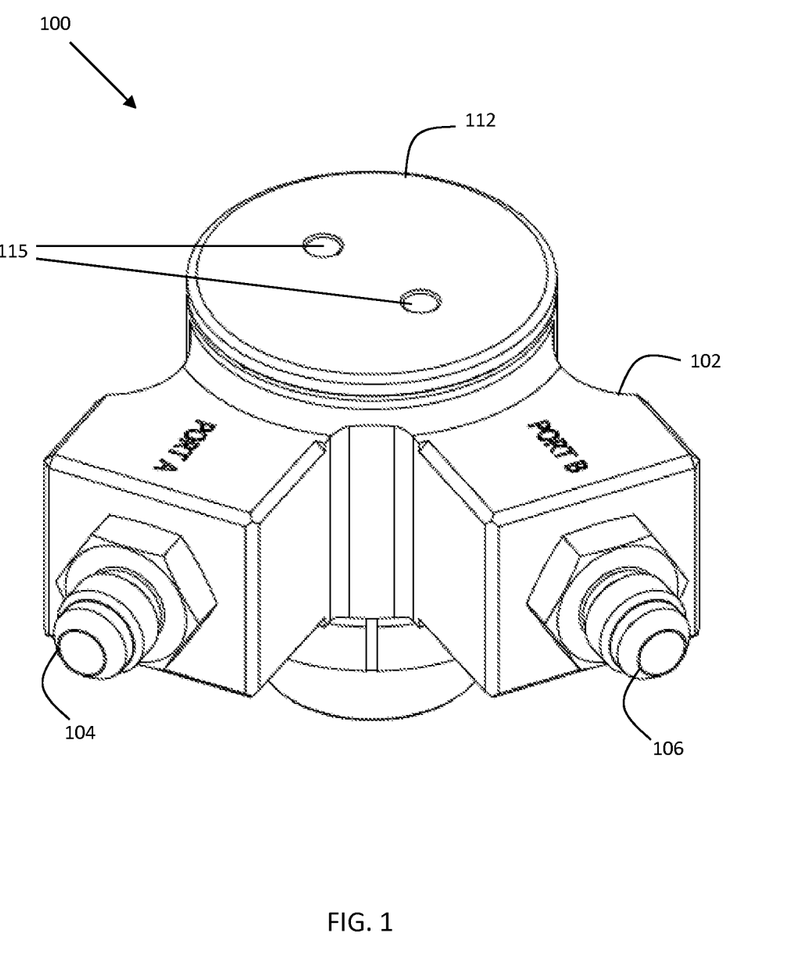
FIG. 1 is an example steering valve.
Figure 2:
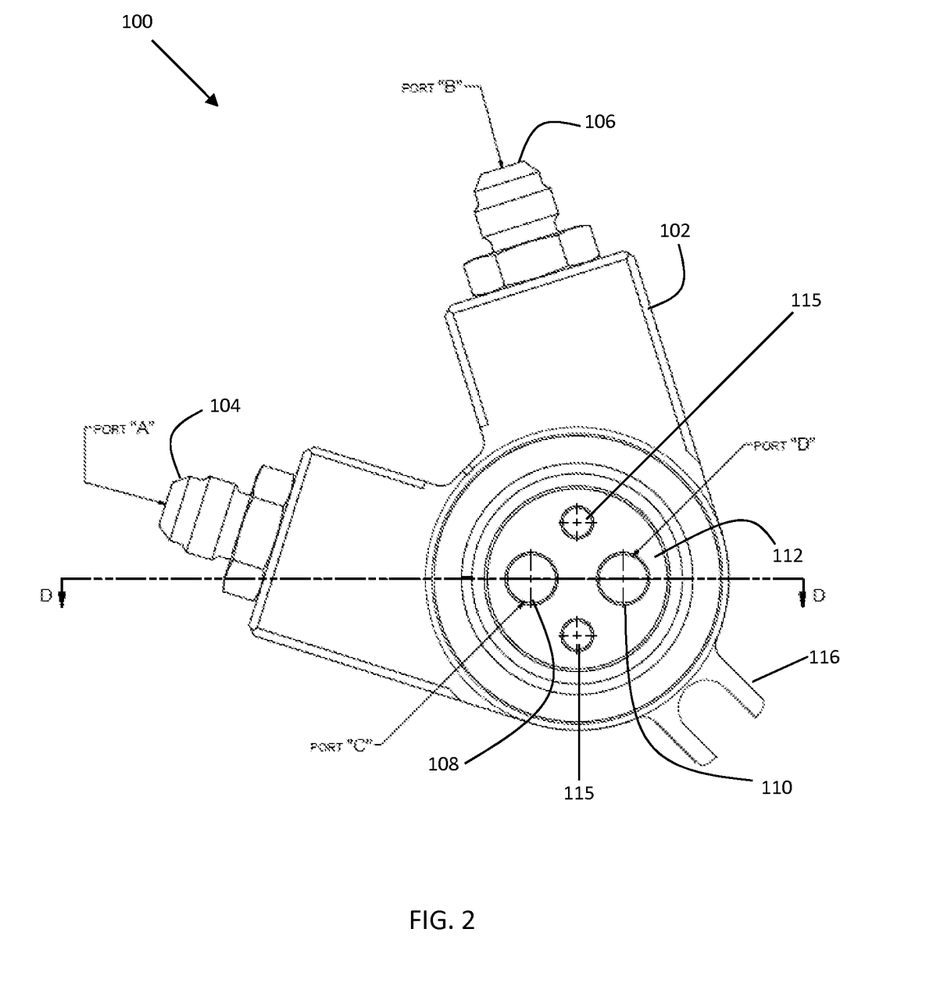
FIG. 2 is a bottom view of the example steering valve of FIG. 1.

FIG. 1 illustrates an example steering valve 100. FIG. 2 illustrates a bottom view of the steering valve 100. The steering valve 100 has a housing 102 for providing overall structure and support. The housing 102 may be light-weight metal alloys, such as aluminum, titanium, tungsten, or other suitable material, such as but not limited to ceramics, carbon reinforced plastics or thermoset plastics. Alternatively, housing 102 could be manufactured from other metals, such as stainless steel. Housing 102 may be manufactured using any number of processes, including machining and casting. In one example, housing 102 is machined from aluminum. In another example, housing 102 is casted. The steering valve 100 may be secured to the landing gear's actuator at the nose of an airplane via any suitable mounting method, for example, using one or more bolt holes 115.

The steering valve 100 is a four-way valve. For example, the steering valve 100 includes a first port 104, or port A, and a second port 106, or port B. Port A 104 is configured to be coupled to a fluid supply line, whereas port B 106 is configured to be coupled to a fluid return line and is not pressurized. In one non-limiting example, port A 104 is supplying hydraulic fluid at a pressure of 3,000 psig; however, it should be appreciated that port A 104 may be pressurized at other pressures, higher or lower than 3,000 psig, so long as the materials utilized in constructing steering valve 100 can tolerate such pressures. For example, steering valve 100 may be utilized in applications where port A 104 is pressurized at 5,000 psig. Conversely, lower pressures, such as 1,200 psig to 1,400 psig, may be used in steering valve 100 where such lower pressures are operable with the actuator to which steering valve 100 is affixed. Thus, a low end pressure range is dependent upon the actuator to which steering valve 100 is attached. It should be appreciated, however, that the materials utilized in constructing steering valve 100 dictate the maximum allowable pressure in port A 104. Some materials will allow port A 104 to operate at higher pressures without failure, whereas other materials require port A 104 to be pressurized at lower pressures so as to not result in failure.

The steering valve 100 also includes a third port 108, or port C, and a fourth port 110, or port D. Port C 108 is configured to couple to a first end of an actuator, for example a double sided push-pull actuator (not shown), and Port D 110 is configured to couple to a second end of the actuator. FIG. 1 and FIG. 2 depict an exemplary embodiment of steering valve 100, wherein one or more bolt holes 115 in spool 112 are utilized to secure it to the actuator when port C 108 and port D 110 are coupled thereto.

Once coupled to the first end and second end of the actuator, Ports C 108 and port D 110 may act as either a return or a supply, respectively. For example, when port C 108 is pressurized and is acting as the supply port, port D 110 is not pressurized and acts as the return port. Alternatively, when port D 110 is pressurized and is acting as the supply port, port C 108 is not pressurized and acts as the return port. Depending on which of port C 108 or port D 110 is pressurized and acting as a supply port, the actuator will cause the landing gear in the nose of an airplane to steer in either a first or second direction (e.g., left or right from center). Where neither port C 108 nor port D 110 is pressurized and acting as the supply port, the actuator will not cause the landing gear at the nose of the airplane to steer in either direction.

The steering valve 100 further includes a spool 112 disposed in the center of the steering valve 100. The spool 112 may be manufactured using any number of metals, light weight metal alloys, or corrosion resistant materials. In one example, spool 112 is manufactured using a corrosion resistant form of steel, such as stainless steel. In another example, the spool 112 is made from a ceramic or a thermoset. In yet another example, spool 112 is made from a light-weight metal alloy, such as titanium. Further, the spool 112 is configured to remain in a fixed position. However, the orientation of the spool 112 relative to the housing 102, which may be rotated in a clockwise or counter-clockwise direction around the spool 112, determines (i) whether port C 108 or port D 110 is pressurized, or (ii) whether neither port C 108 nor port D 110 is pressurized. For example, when not rotated in either direction relative to spool 112, the housing 102 will be oriented in a default or neutral position (not shown). When housing 102 is in this default or neutral position relative the spool 112, neither port C 108 nor port D 110 will be pressurized, and the landing gear at the nose of an airplane will remain in a straight-ahead course or direction rather than being steered left or right. However, rotation of housing 102 around spool 112 in one of a first or a second direction (i.e., in a clockwise or counter-clockwise direction relative to the spool 112) will cause either port C 108 or Port D 110 to become pressurized. Pressurization of either port C 108 or Port D 110, in turn, will cause the actuator at the nose of the airplane to steer the landing gear in a first or second direction. Accordingly, the steering valve 100 is a four-way valve, where housing 102 may be oriented in various positions with respect to spool 112 that each correlate to a direction of landing gear in the nose of the airplane.

The housing 102 of the steering valve 100 is configured to be coupled to a steering column (not shown) of the airplane, for example, by a pin (not shown) that engages housing 102 via mounting bracket 116. Thus, movement in the steering column translates to a rotation of the housing 102. More specifically, movement in the steering column causes the housing 102 to rotate relative to the spool 112, causing pressurization of either port C 108 or Port D 110 (when housing 102 is not oriented in its default or neutral position), which in turn triggers the actuator affixed to the airplane nose's landing gear. Thus, movement of the steering column affects pressurization in port C 108 and Port D 110 and, in turn, causes the airplane to steer accordingly.

Figure 3:
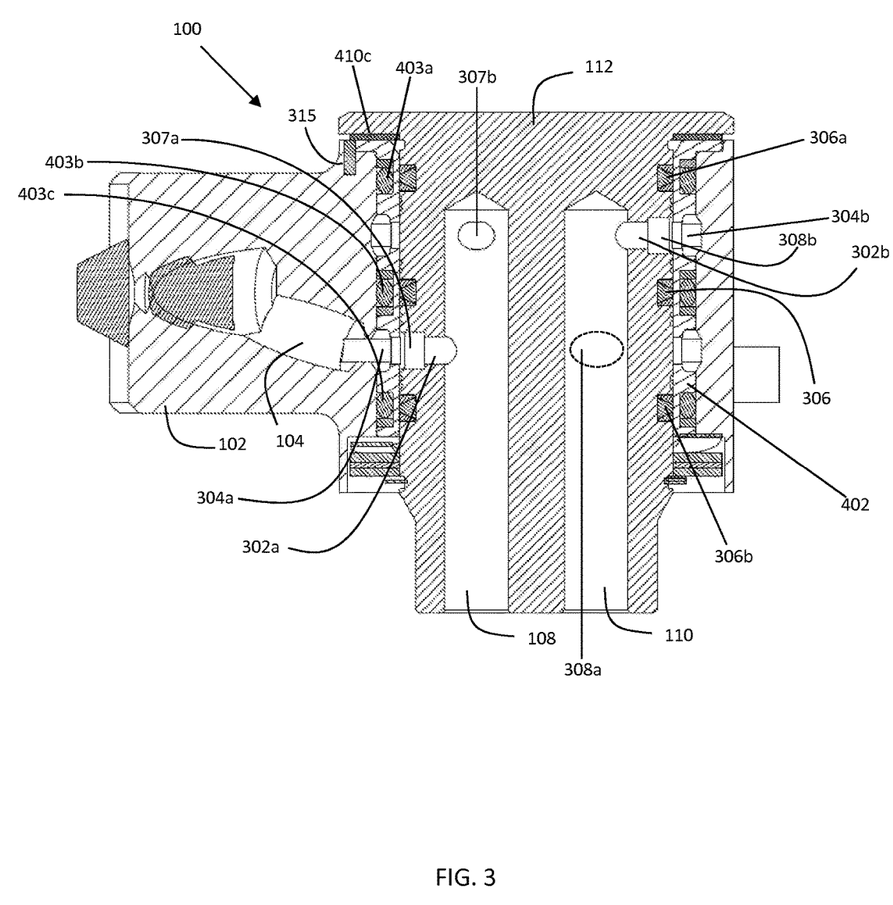
FIG. 3 illustrates a cross-section side view of the example steering valve of FIG. 1.
Figure 14:
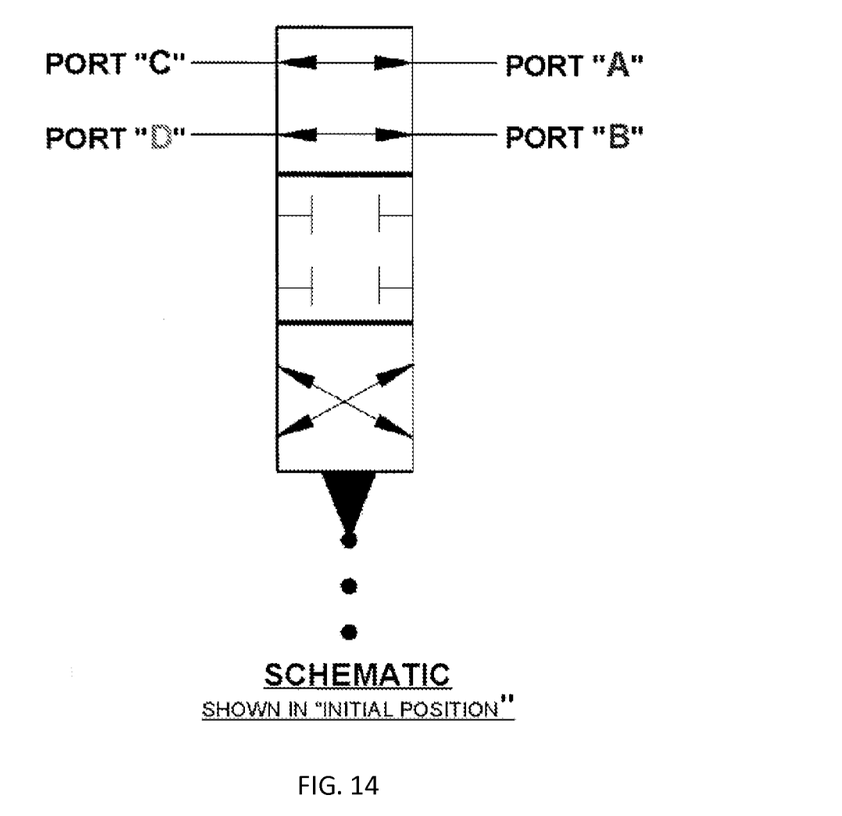
FIG. 14 is a schematic depicting the operation of steering valve's various ports.

FIG. 3 is a cross-section view of the steering valve 100 taken along D-D of FIG. 2, and depicts (i) an opening 304a leading to port A 104, (ii) an opening 304b leading to port B 106, (iii) an opening 307a leading to port C 108, (iv) an opening 308b leading to port D 110, (v) an opening 307b leading to port C 108, and (vi) an opening 308a leading to port D 110. Steering valve 100 also comprises connectors, or passageways, that facilitate a fluid connection (i) between port A 104 and either port C 108 or port D 110, and (ii) between port B 106 and either port D 110 or port C 108. In operation, the housing 102 may be rotated around the spool 112 until opening 304a of port A 104 aligns with one of either opening 307a of port C 108 or opening 308a of port D 110. This rotation of housing 102 will similarly align opening 304b of port B 106 with the other of either opening 307b of port C 108 or opening 308b of port D 110. Thus, when opening 304a of port A 104 is aligned with opening 307a of port C 108, then opening 304b of port B 106 will be aligned with opening 308b of port D 110, and vice versa. The schematic in FIG. 14 depicts the operation of steering valve's 100 various ports.

The cross-sectional view of FIG. 3 depicts the specific condition of steering valve 100, where housing 102 has been rotated around spool 112 from its default/neutral position to a first position. This first position of housing 102 with respect to spool 112 allows connectors 302a and 302b (or, rather, passageways 302a and 302b) to form fluid connections between port A 104 and port C 108 via openings 304a and 307a, and between port B 106 and port D 110 via openings 304b and 308b, respectively (the "First Position"). It should be appreciated, however, that opening 307b is fluidly connected to port C 108 via a third connector/passageway (not shown in FIG. 3) and that opening 308a is fluidly connected to port D 110 via a fourth connector/passageway (also not shown in FIG. 3). Thus, when housing 102 is rotated around spool 112 from its default/neutral position to a second position (not shown), the third connector/passageway will establish a fluid connection between port B 106 and port C 108 via openings 304b and 307b, and the fourth connector/passageway will establish a fluid connection between port A 104 and port D 110 via openings 304a and 308a (the "Second Position").

It should be appreciated that the degree of rotation needed to orient housing 102 with respect spool 112 into either the First Position or Second Position is customizable by an end-user. Thus, the end-user can vary the degree of rotation needed to orient housing 102 into the First Position and Second Position by altering the geometry and/or placement of openings 304a, 307a, 308a, 304b, 308b, and 307b. This allows utilization of steering valve 100 in a number of different applications where different degrees of housing 102 rotation with respect to spool 112 is desirable.

Importantly, steering valve 100 includes two valve planes. For example, the steering valve 100 is configured such that port A 104 forms a fluid connection with one of port C 108 or port D 110 at a different level plane as compared to the simultaneous fluid connection formed between port B 106 and the other of port D 110 or port C 108. The two valve planes are separated by a seal 306, which contains any leakage and for prevents cross-leakage. Thus, leakage from port A 104 is prevented from entering port B 106, while leakage from port B 106 is prevented from entering port A 104. By separating the fluid connections into two different planes and effectively creating two different valves that are each impervious to cross-leakage from the other, the need for extremely close tolerances when manufacturing the steering valve 100 is reduced. This is because some leakage may be more tolerable as compared to a design in which both its port A and port B are disposed on a single plane without a seal separating the two ports.

Figure 8:
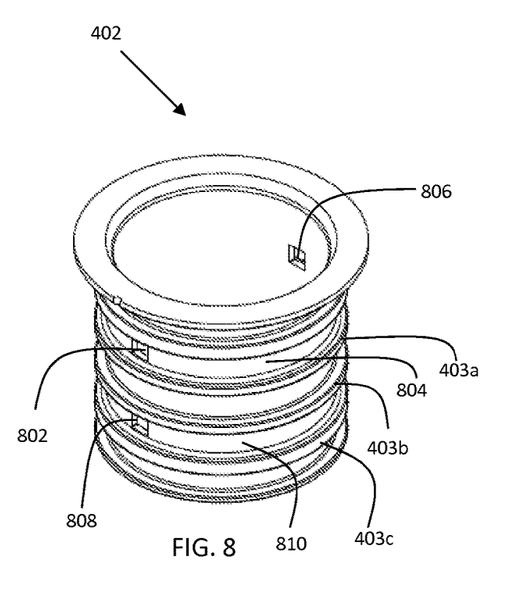
FIG. 8 is an example sleeve of FIG. 4.
Figure 9:
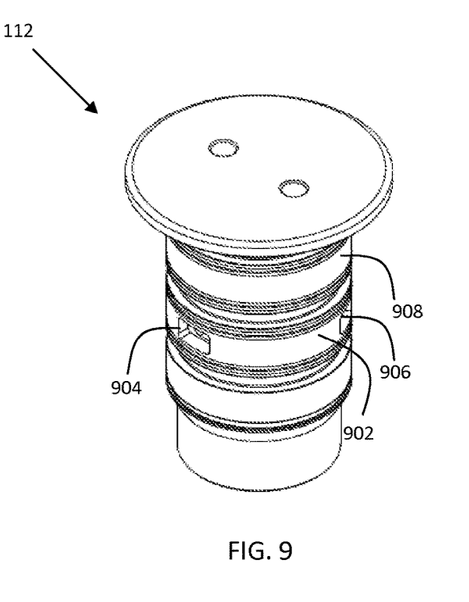
FIG. 9 is an example spool of FIG. 4.

In one example, steering valve 100 further comprises a seal 306a above the top valve plane, as well as seal 306b below the bottom valve plane. In this example, seals 306, 306a, and 306b are dynamic seals. In another example, the seals 306, 306a and/or 306b are thermoset seals. In yet another example, the seals 306, 306a and/or 306b are O-rings. It should be appreciated that other suitable types of seals may be used to prevent cross-leakage between port A 104 and port B 106. FIG. 8 and FIG. 9 depict the orientation the top valve plane and bottom valve plane with respect to the sleeve 402 and spool 112, respectively.

Figure 4:
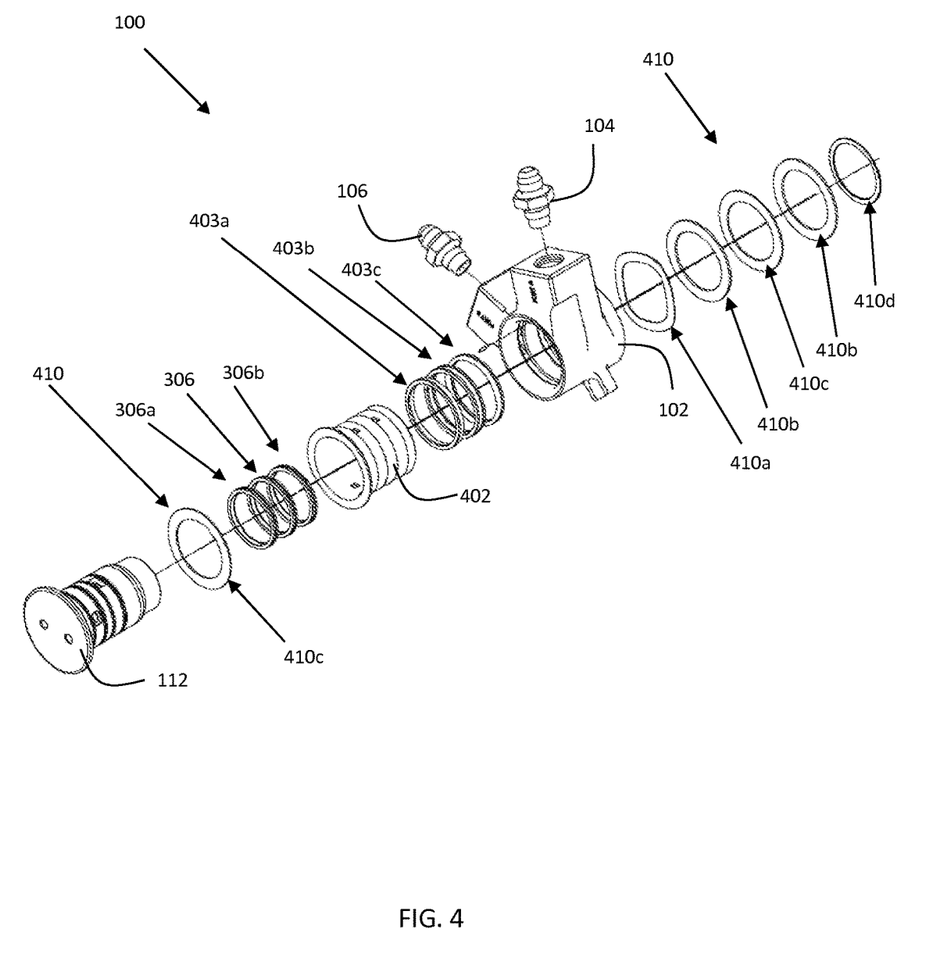
FIG. 4 is an exploded view of the example steering valve of FIG. 1.

FIG. 4 illustrates an exploded view of the steering valve 100 of FIG. 1, including the housing 102, port A 104, port B 106, the spool 112, and seals 306, 306a and 306b. The steering valve 100 further includes a sleeve 402 for receiving the spool 112 inside the housing 102. Sleeve 402 is configured to rotate in conjunction with housing 102, for example, by way of the anti-rotational element 315 depicted in FIG. 3. The sleeve 402 may be manufactured using metals or other suitable material. In one example, sleeve 402 is manufactured using a corrosion resistant form of steel, such as stainless steel. Moreover, sleeve 402 is configured to receive seals 403a, 403b, and 403c on an external surface thereof. As depicted in the example of FIG. 3, seals 403a, 403b, and 403c establish a seal between the outer surface of sleeve 402 and the inner surface of housing 102. In this example, seals 403a, 403b, and 403c are static seals and provide additional separation and leakage protection.

FIG. 4 depicts another example of steering valve 100 where washer assembly 410 is utilized. In this example, washer assembly 410 comprises washer 410a, washers 410b, washers 410c, and snap ring 410d. Washer 410a is a washer designed to provide a compensating spring force or absorb shock when under load, such as a wave washer. Washers 410b may be made of a hard material having slippery outer surfaces that allow rotation of one of washers 410c there between, for example, metal washers with a slick or smooth outer surface. Washers 410c may be any type of thrust bearings or self-lubricating thrust washers, such as a Teflon ring. FIG. 3 depicts an example where washers 410c are Teflon rings, and where one such Teflon ring is disposed between the lip of spool 112 and the lip of sleeve 402. Lastly, snap ring 410d is utilized to securely hold together the inner components of steering valve 100.

Figure 5:
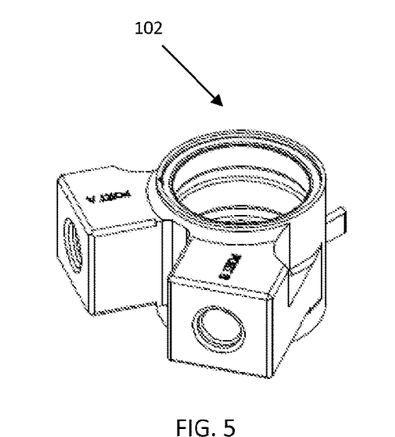
FIG. 5 is an example housing of the example steering valve of FIG. 1.
Figure 6:
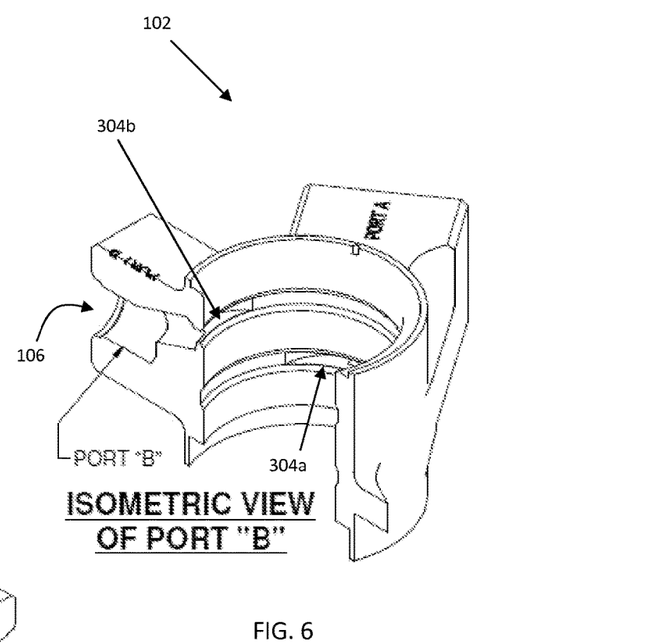
FIG. 6 is a cut-out view of the housing of FIG. 5.
Figure 7:
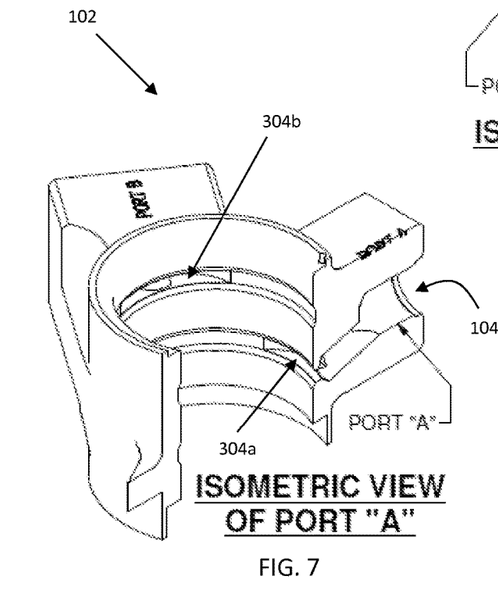
FIG. 7 is a cut-out view of the housing of FIG. 5.

FIG. 5 illustrates the housing 102 of the steering valve 100. FIG. 6 is a cut-out view of the housing 102, illustrating port B 106 leading to opening 304b in a top plane on the inside of housing 102. FIG. 7 is a cut-out view of the housing 102, illustrating port A 104 leading to opening 304a in a bottom plane on the inside of housing 102.

FIG. 8 illustrates the sleeve 402 of FIG. 4. The sleeve 402 includes a first upper opening 802 on a first or upper plane 804 for enabling a fluid connection between port B 106 and one of port C 108 or port D 110 depending on the orientation of the housing 102. The sleeve 402 further includes a second upper opening 806 on the first/upper plane 804 for enabling a fluid connection between port B 106 and the other one of port C 108 or port D 110. The sleeve 402 further includes a second or lower plane 810 including a first lower opening 808 and a second lower opening (not shown) for enabling a fluid connection between port A 104 and port C 108 as well as between port A 104 and port D 110, depending on the orientation of the housing 102. FIG. 8 also depicts an exemplary orientation of seals 403a, 403b, and 403c on the sleeve 402 relative to planes 804 and 810. It should be appreciated that the geometry and orientation of the first and second upper openings (802 and 806) as well as the first and second lower openings (808 and not shown) with respect to sleeve 402 is customizable by the end-user and dependent on the location of the other openings in housing 102 and spool 112, as discussed above.

FIG. 9 illustrates the spool 112 of FIG. 4. The spool 112 has a lower plane 902 including first and second lower openings 904 and 906 corresponding to the first lower opening 808 and the second lower opening (not shown) of the sleeve 402 for enabling a fluid connection between port A 104 and port C 108 as well as between port A 104 and port D 110, depending on the orientation of the housing 102. The spool 112 also has an upper plane 908 including a first upper opening (not shown) and a second upper opening (also not shown) corresponding to the first upper opening 802 and second upper opening 806 of the sleeve 402 for enabling a fluid connection between port B 106 and port C 108 as well as between port B 106 and port D 110, depending on the orientation of the housing 102. Note, first and second lower openings 904 and 906 are depicted in FIG. 3 as opening 307a leading to port C 108 and opening 308a leading to port D 110. The spool's 112 first and second upper openings (neither of which are depicted in FIG. 9) are also depicted in FIG. 3 as opening 307b leading to port C 108 and opening 308b leading to port D 110. Again, the specific geometry and orientation of the various openings on any of the housing 102, spool 112, and sleeve 402 are customizable and may depend on an end-user's desired application.

Figure 10:
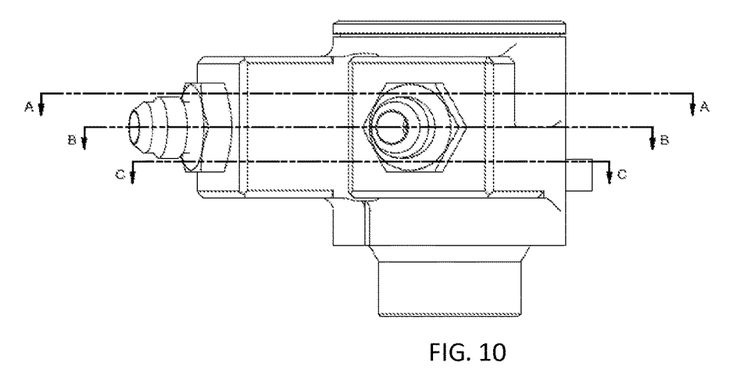
FIG. 10 is side view of the example steering valve of FIG. 1.
Figure 11:
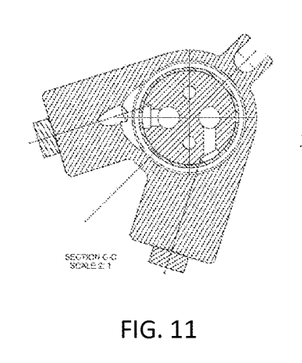
FIGS. 11-13 are cross-section top views of the example steering valve of FIG. 1.
Figure 12:
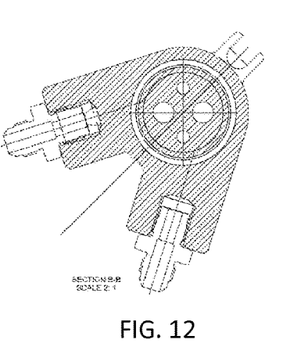
Figure 13:
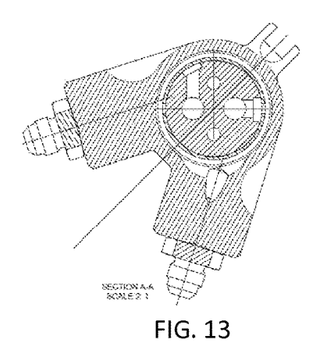

FIG. 10 illustrates a side view of the steering valve 100. FIGS. 11-13 illustrate cross-sectional top views of steering valve 100 along A-A, B-B, and C-C of FIG. 10, respectively.

Thus, in operation steering valve 100 works as follows. For example, the pilot of an airplane may rotate the steering wheel intending to turn the landing gear at the nose of the plane in a certain direction. This action causes movement in the steering column, which in turn translates to rotation of housing 102 in a certain direction. Rotation of housing 102 in that direction causes (i) alignment of opening 304a of port A 104 with one of either opening 307a of port C 108 or opening 308a of port D 110 and, similarly (ii) alignment of opening 304b of port B 106 with the other of either opening 307b of port C 108 or opening 308b of port D 110. Alignment of port A 104 with port C 108 and port B 106 with port D 110 causes the nose wheel steering actuator to steer the landing gear in a first direction. On the other hand, alignment of port A 104 with port D 110 and port B 106 with port C 108 causes the nose wheel steering actuator to steer the landing gear in the opposite direction.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2 d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed:

1. A steering valve comprising:
   a housing comprising an opening of a first port in a top plane and an opening of a second port in a bottom plane; and
   a spool disposed inside the housing, the spool comprising:
      a first and a second opening on the top plane corresponding to a third port and a fourth port, one of the first or the second openings on the top plane being configured to align with the opening of the first port depending on the orientation of the housing; and
      a first and a second opening on the bottom plane corresponding to the third port and the fourth port, one of the first or the second openings on the bottom plane being configured to align with the opening of the second port depending on the orientation of the housing;
   wherein rotation of the housing in a first direction causes a fluid connection between the first port in the top plane and the third port via the first opening in the top plane of the spool, while the second port is fluidly connected to the fourth port via the first opening on the bottom plane of the spool.

2. The steering valve of claim 1, wherein rotation of the housing in a second direction causes a fluid connection between the first port in the top plane and the fourth port via the second opening in the top plane of the spool, while the second port is fluidly connected to the third port via the second opening on the bottom plane of the spool.

3. The steering valve of claim 2, further comprising a sleeve that is adapted both to be secured to an inside surface of the housing and to receive the spool, the sleeve containing a first and second opening on the first plane and a first and second opening on the second plane.

4. A steering valve comprising:
   a housing comprising an opening of a first port in a top plane and an opening of a second port in a bottom plane; and
   a spool disposed inside the housing, the spool comprising:
      a first and a second opening on the top plane corresponding to a third port and a fourth port, one of the first or the second openings on the top plane being configured to align with the opening of the first port depending on the orientation of the housing; and
      a first and a second opening on the bottom plane corresponding to the third port and the fourth port, one of the first or the second openings on the bottom plane being configured to align with the opening of the second port depending on the orientation of the housing;
   wherein rotation of the housing in a first direction causes a fluid connection between the first port in the top plane and the third port via the first opening in the top plane of the spool, while the second port is fluidly connected to the fourth port via the first opening on the bottom plane of the spool;
   wherein rotation of the housing in a second direction causes a fluid connection between the first port in the top plane and the fourth port via the second opening in the top plane of the spool, while the second port is fluidly connected to the third port via the second opening on the bottom plane of the spool.

5. The steering valve of claim 4, further comprising a sleeve that is adapted both to be secured to an inside surface of the housing and to receive the spool, the sleeve containing a first and second opening on the first plane and a first and second opening on the second plane.

6. A steering valve comprising:
   a housing comprising an opening of a first port in a top plane and an opening of a second port in a bottom plane; and
   a sleeve disposed within the housing and comprising containing a first and second opening on the first plane and a first and second opening on the second plane;
   a spool disposed to rotate inside the sleeve, the spool comprising:
      a first and a second opening on the top plane corresponding to a third port and a fourth port, one of the first or the second openings on the top plane being configured to align with the opening of the first port depending on the orientation of the housing; and
      a first and a second opening on the bottom plane corresponding to the third port and the fourth port, one of the first or the second openings on the bottom plane being configured to align with the opening of the second port depending on the orientation of the housing;
   wherein rotation of the housing in a first direction causes a fluid connection between the first port in the top plane and the third port via the first opening in the top plane of the spool, while the second port is fluidly connected to the fourth port via the first opening on the bottom plane of the spool;
   wherein rotation of the housing in a second direction causes a fluid connection between the first port in the top plane and the fourth port via the second opening in the top plane of the spool, while the second port is fluidly connected to the third port via the second opening on the bottom plane of the spool.

7. A steering valve comprising:
   a housing comprising a top plane and a bottom plane, the top plane comprising an opening of a first port and the bottom plane comprising an opening of a second port; and a spool disposed inside the housing comprising:
   a top plane comprising a first and second opening corresponding to a third port and a fourth port, one of which is configured to align with the opening of the first port depending on the orientation of the housing; and
   a bottom plane comprising a first and second opening corresponding to the third port and fourth port, one of which is configured to align with the opening of the second port depending on the orientation of the housing;
wherein the housing is configured to rotate a sleeve around the spool and wherein the orientation of the housing determines whether the first port is fluidly coupled to the third port via the first opening in the top plane of the spool while the second port is fluidly coupled to the fourth port via the first opening on the bottom plane of the spool or whether the second port is fluidly coupled to the third port via the second opening in the top plane of the spool while the first port is fluidly coupled to the fourth port via the second opening on the bottom plane of the spool.

* * * * *